(12) United States Patent
Shao et al.

(10) Patent No.: US 12,222,852 B2
(45) Date of Patent: Feb. 11, 2025

(54) IMBALANCE DETECTION IN ONLINE EXPERIMENTS

(71) Applicant: Etsy, Inc., Brooklyn, NY (US)

(72) Inventors: Stephane Shao, New York, NY (US); Lyubov Ignatovsky, New York, NY (US); Julie Beckley, New York, NY (US)

(73) Assignee: Etsy, Inc., Brooklyn, NY (US)

(*) Notice: Subject to any disclaimer, the term of this patent is extended or adjusted under 35 U.S.C. 154(b) by 208 days.

(21) Appl. No.: 18/114,773

(22) Filed: Feb. 27, 2023

(65) Prior Publication Data

US 2023/0273874 A1 Aug. 31, 2023

Related U.S. Application Data

(60) Provisional application No. 63/314,033, filed on Feb. 25, 2022.

(51) Int. Cl.
*G06F 11/36* (2006.01)
*G06F 8/71* (2018.01)

(52) U.S. Cl.
CPC ............ *G06F 11/3696* (2013.01); *G06F 8/71* (2013.01)

(58) Field of Classification Search
CPC .... G06F 11/3696; G06F 8/71; G06F 11/3688; G06F 9/5083
USPC ....................................................... 714/38.1
See application file for complete search history.

(56) References Cited

U.S. PATENT DOCUMENTS

2016/0275564 A1* 9/2016 Reynolds ........... G06Q 30/0269

* cited by examiner

*Primary Examiner* — Yair Leibovich
(74) *Attorney, Agent, or Firm* — Fish & Richardson P.C.

(57) ABSTRACT

Methods, systems, and apparatus, including computer programs encoded on computer-storage media, for imbalance detection in online experiments. In some implementations, a method includes obtaining user information indicating a first set of devices assigned a first version of a service and a second set of devices assigned a second version of the service in a multivariate testing framework; generating alternative samplings of devices; generating a threshold for detecting imbalance using the alternative samplings of devices, a generated expected first set of devices, and a generated expected second set of devices; detecting an imbalance using the obtained user information indicating the first set of devices, the second set of devices, and the generated threshold; and implementing a corrective action to mitigate the detected imbalance in the multivariate testing framework.

20 Claims, 8 Drawing Sheets

FIG. 5A

IMBALANCE DETECTION IN ONLINE EXPERIMENTS

CROSS-REFERENCE TO RELATED APPLICATIONS

This application claims the benefit under 35 U.S.C. § 119(e) of U.S. Patent Application No. 63/314,033, entitled "Imbalance Detection in Online Experiments," filed Feb. 25, 2022. The disclosure of the foregoing application is incorporated herein by reference in its entirety for all purposes.

BACKGROUND

Experimentation, such as A/B testing involves operating two versions of an application or other content to quantify an impact of a feature that is included in one version but not the other.

SUMMARY

Techniques described in this document provide resource efficient techniques that automatically detect the imbalance in experimentation. Detecting imbalances can reduce consumption of computing resources, e.g., resource consumption that would otherwise result from running imbalanced experiments for which results might not be reliable or accurate. The imbalance detection techniques described can provide a framework for achieving accurate and reliable experimentation results in a resource efficient manner.

The imbalance detections techniques described in this document are scalable and resource efficient in the way the data processing via permutation tests are applied to contingency tables that can be based on millions of data points for various experiments, e.g., instead of being applied to the raw data points themselves.

Moreover, as further described in this document, the imbalance detection techniques described herein speed up experiment processing and thus, improve the underlying data processing apparatus performing these techniques, by enabling the permutation tests to be independently run in parallel (one test per experiment per segmentation) with all permutations being performed in parallel for a given test as well. In this manner, the parallel processing enabled by the techniques described herein can leverage distributed computing to perform a large number of experiments or tests at a scale without overwhelming available computing resources.

The techniques and methods described in this document are explained, in part, with reference to an example production environment of an e-Commerce or exchange platform/website. However, one skilled in the art will appreciate that the techniques described are applicable in any number of applications and systems (e.g., search applications, systems for recommending content or items for provision to users, among others), which might leverage similar experimentation or testing mechanism for comparing particular features and their resulting impact on system operation and associated metrics.

For brevity and ease of explanation, portions of the following descriptions apply the techniques described in this specification with reference to an example exchange platform.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 5A is a diagram showing an example notification indicating an imbalance detection.

Like reference numbers and designations in the various drawings indicate like elements.

DETAILED DESCRIPTION

In general, techniques described in this document include automatic detection of imbalances within devices or users selected for NB or multivariate testing. Detection before analysis of testing data using such imbalanced groups reduces use of energy and computation resources.

A system for imbalance detection can obtain information indicating the populations of devices or users selected for one or more versions of software or services to be tested. The system, such as system 100 described in this document, can generate a threshold which may be dynamic based on a generated set of artificial groupings indicating one or more devices or users assigned to various versions or variants. The system can determine the actual observed distribution of users or devices assigned to one or more versions or variants and determine whether the actual observed distribution satisfies, or does not satisfy, the generated threshold. The system can then perform subsequent actions to either halt processing or actively correct the distribution of users or devices that receive versions or variants of software or a service.

Figure 1:
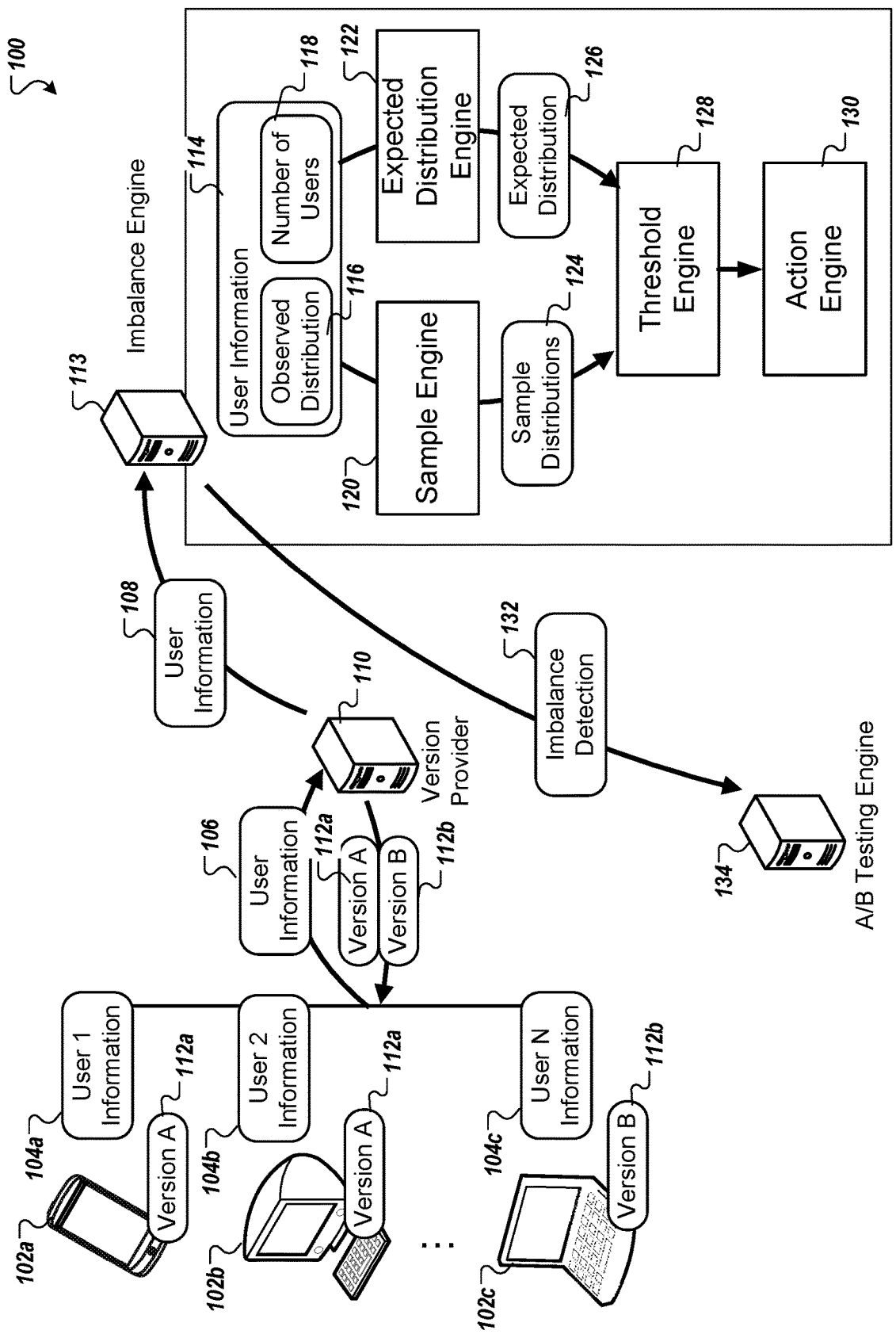
FIG. 1 is a diagram showing an example of a system for detecting imbalance in online experiments.

FIG. 1 is a diagram showing an example of a system 100 for detecting imbalance in online experiments. The system 100 includes an imbalance engine 113 that generates an imbalance detection 132 using information from devices 102*a-c*. The system 100 includes the devices 102*a-c*, a version provider 110, and a testing engine 134.

The imbalance engine 113 can generate the imbalance detection 132 when a distribution of devices that receive a first version of software code, e.g., configured to perform a service or render a webpage, are sufficiently different from a distribution of devices that receive a second version of software code. Distributions of devices are sufficiently different when a difference threshold is satisfied. In one example, if eighty percent of devices of a certain platform receive a first version of software code rather than a second version, a difference threshold can be satisfied. If these distributions are used in A/B testing, such as in tests that determine similarities or differences between the use of the first version and the second version, results of the testing may be biased based on differences in the distribution rather than differences in the software versions. This sort of interference can invalidate any results from the NB testing and result in wasted processing and energy resources used during testing and analysis. In general, NB testing requires sufficiently similar distributions of devices processing the "A" version and "B" version, respectively. Versions may also be referred to as variants. Although the techniques described in this specification are provided in the context of NB experimentation, similar techniques can be applied in other contexts, e.g., in the context of multivariate testing where more than two features or versions or characteristics are modified.

The version provider 110 obtains user information 106 from the devices 102a-c and provides a version, e.g., either version A 112a, or version B 112b, to one or more of the devices 102a-c. In some implementations, the version provider 110 provides either version A 112a or version B 112b to each of the devices 102a-c using information provided by the devices 102a-c. In some implementations, the version provider 110 provides either version A 112a or version B 112b to each of the devices 102a-c using one or more random or pseudo random algorithms.

In some implementations, the user information 106 obtained by the version provider 110 includes one or more values indicating a feature or location of a given device or user corresponding to the devices 102a-c. For example, the user information 106 can include one or more values indicating one or more of the following: visit frequency, region, buyer type, channel, past year purchase days, language, platform, or new visitor. The user information 106 can combine one or more elements from user information 104a-c received from the devices 102a-c, respectively. Values can indicate how a given device has processed services or webpages similar to or identical to webpages or services represented by the versions 112a-b. For example, the user information 106 can include information indicating how a given device processed (e.g., interacted with) a version of a service or webpage that existed on the given device before the device received or requested either version A 112a or version B 112b.

In some implementations, the user information 106 includes one or more values indicating a visit frequency for one or more of the devices 102a-c. For example, visit frequency can represent how many times, or how long, a device of the devices 102a-c visits a webpage or other service corresponding to the versions 112a-b. Region can represent a region from which a given device transmits and receives signals in communication with the version provider 110—e.g., IP location, among others—or where a given device is registered within a user registry maintained by one or more elements of the system 100.

In some implementations, the user information 106 includes one or more values indicating a platform of one or more of the devices 102a-c. For example, a platform can represent a type of device or software being used by a given device of the devices 102a-c to access the service or webpage represented by the versions 112a-b. In some implementations, the user information 106 includes one or more values indicating a language for one or more of the devices 102a-c. For example, values indicating language can represent a type of language being used on a given device of the devices 102a-c.

In some implementations, the user information 106 includes one or more values indicating whether a device is a new visitor. For example, the user information 106 can include one or more values indicating whether or not one of the devices 102a-c is a new device, e.g., a device that has not before used or visited a service or webpage represented by the versions 112a-b. In some implementations, the user information 106 includes one or more values indicating a channel corresponding to a device. For example, values indicating a channel corresponding to a device can represent how a browser or device navigated to a service or webpage represented by the versions 112a-b. Devices, e.g., one or more of the devices 102a-c, can use search engines to navigate to a website represented by the versions 112a-b. Devices can use other software or algorithms to access a service represented by the versions 112a-b. In some implementations, the user information 106 includes one or more values indicating a buyer type corresponding to a device. For example, one or more values indicating a buyer type can represent how a given device has used a service or webpage represented by the versions 112a-b over time.

The version provider 110 can provide versions 112a and 112b to multiple user devices 102a-c. The elements of the system 100 can be communicably connected, e.g., by one or more wired or wireless communication systems. The versions 112a and 112b can represent particular software, webpage elements, services, applications, among others. The versions 112a and 112b can be configured to run on the user devices 102a-c.

In some implementations, the version provider 110, the imbalance engine 113, and the testing engine 134, or two or more of the version provider 110, the imbalance engine 113, and the testing engine 134 are operated by a set of one or more processors or computers. For example, a single computer can operate each of the version provider 110, the imbalance engine 113, and the testing engine 134. A single computer can operate the imbalance engine 113 and the testing engine 134. A single computer can operated the version provider 110.

Imbalance Engine Processing

In some implementations, the version provider 110 generates and provides user information 108 using the user information 106 to the imbalance engine 113. The user information 108 can include one or more elements included in the user information. The user information 108 can include one or more additional elements generated by the version provider 110 using the user information 106.

In some implementations, the imbalance engine 113 processes a received version 114 of the user information 108 to generate the imbalance detection 132. In some implementations, the imbalance engine 113 generates the imbalance detection 132 using one or more processing engines, such as a sample engine 120, an expected distribution engine 122, a threshold engine 128, and an action engine 130. In some implementations, the imbalance engine 113 includes one or more processing devices or computers configured to perform one or more operations to generate data representing the imbalance detection 132.

In some implementations, the imbalance engine 113 determines an observed distribution 116 in the received user information 114. The observed distribution 116 can include an indication of what devices received which version of the versions 112a-b. For example, the observed distribution 116 can represent that devices 102a and 102b received version A 112a and device 102c received version B 112b, among other devices not shown in FIG. 1 for simplicity. In general, any number of devices can be provided versions and provide information to the version provider 110.

In some implementations, the imbalance engine 113 determines a number of users 118 in the received user information 114. For example, the imbalance engine 113 can determine a number of devices that receive versions, such as the devices 102*a-c*, among others not shown. The imbalance engine 113 can provide user information 114, including one or more elements of determined or generated data to subsequent engines for processing.

Sample Engine and Expected Distribution Engine Processing

In some implementations, the imbalance engine 113 provides data to the sample engine 120 and the expected distribution engine 122. The sample engine 120 and the expected distribution engine 122 can be configured to process the data to generate sample distributions 124 and expected distribution 126, respectively.

In some implementations, the sample engine 120 generates the sample distributions 124. For example, the sample distributions 124 can be similar to the observed distribution 116 but can represent hypothetical distribution of devices instead of the actual observed distribution. Because the number of devices can include multiple thousands of devices, individual re-sampling to generate hypothetical distributions can be computationally infeasible or resource intensive. A more computationally efficient approach includes generating permuted variant labels, where variant labels can include devices that can be represented by one or more features, such as language of device, platform, region, among others described herein—e.g., a first variant can include devices using a first language operating on a first platform, or any other combinations of features described herein. The sample distributions 124 generated by the sample engine 120 can be provided, e.g., by the imbalance engine 113, to the threshold engine 128.

In some implementations, the imbalance engine 113 simulates a permutation distribution of contingency tables. The permutation distribution of contingency tables can indicate other possible variants or versions provided to one or more of the number of users 118. The permutation distribution of contingency tables can include one or more of the sample distributions 124. In some implementations, simulation of a permutation distribution is performed by the sample engine 120. To reduce computational resources or bandwidth, a permutation distribution can be simulated instead of individually permuting each of one or more variant labels across one or more users, e.g., the number of users 118 or associated devices.

Whereas the number of devices or users assigned or provided a variant (e.g., version A 112*a* or version B 112*b*) can generally be large (e.g., hundreds, thousands, millions), dimensions of a contingency table (e.g., contingency table 250 and 270 of FIG. 2B) are fixed and do not depend on the number of users or devices in a given experiment. By simulating how such a table would look if the imbalance engine 113 or the sample engine 120 did individually reassign variants or versions per user but not individually reassigning variants or versions per user and instead simulating aggregated amounts of different user types assigned to different variants or versions, the system 100 can reduce computational resources required and reduce processing time for determining imbalances and taking any subsequent action to further reduce computational or energy resource use. While permuting variant labels would mean permuting millions of variables if there were millions of units in an experiment, simulating a permutation distribution of contingency tables, e.g., generating the sample distributions, saves resources and increases efficiency.

In some implementations, the expected distribution engine 122 generates the expected distribution 126. For example, the expected distribution engine 122 can include one or more algorithms or processes to determine, based on one or more features of the user information 114, what an expected distribution of user devices assigned a first version—such as version A 112*a*—and user devices assigned a second version—such as version B 112*b*. The expected distribution 126, similar to the sample distributions 124 and the observed distribution 116, can include features of user devices assigned to each version. For example, the expected distribution 126 can include one or more values indicating how many devices provided version A are associated with first time visitors or users, a specific platform (such as Chromium browser, specific hardware device, among others), among other features of devices described herein.

Threshold Engine

Output of the sample engine 120 and the expected distribution engine 122, e.g., the sample distributions 124 and the expected distribution 126, can be provided, e.g., by the imbalance engine 113, to the threshold engine 128. As with other elements described in reference to FIG. 1, various implementations of the threshold engine 128 are described in this document.

In some implementations, the threshold engine 128 includes one or more processing elements to generate difference values between the sample distributions 124 and the expected distribution 126. For example, the threshold engine 128 can generate one or more difference values indicating a difference between one or more sample distributions in the sample distributions 124 and one or more portions of the expected distribution 126. In an example case, a sample of the sample distributions 124 can include a number of devices that receive version A, e.g., version A 112*a*, and features of those devices, e.g., how many are located in the United States, have a language set to English, have used a similar or same service before, among other features described in this document. The expected distribution 126 can similarly indicate a number of different types of devices or corresponding users that receive one or more different versions of software.

The threshold engine 128 determines whether or not the observed distribution 116 satisfies an imbalance threshold determined by the threshold engine 128. An imbalance threshold can include a percentile determined by the threshold engine 128 within a distribution generated from one or more difference values generated by the threshold engine 128 between one or more samples of the sample distributions 124 and the expected distribution 126. For example, one possible example of such a threshold is shown and described in reference to FIG. 2B.

In some implementations, the threshold engine 128 adjusts one or more thresholds. For example, the threshold engine 128 can obtain data from the NB testing engine 134 or other element. The data can indicate changes to one or more thresholds. For example, data can indicate that specific types of devices should be considered equivalent. In a default case, the threshold engine 128 may determine that 10 percent English language based browsers and 90 percent non-English browsers contributes difference value that results in an imbalance threshold being satisfied. Data from the NB testing engine 134 or other element can indicate that the English language based browsers and non-English browsers are equivalent for the given NB testing.

In some implementations, threshold engine 128 uses such device type contextual data before determining whether an imbalance threshold is satisfied. For example, one or more difference values generated by the threshold engine 128 can be dependent on data obtained from the NB testing engine 134 or other element. For example, to extend the language browsers discussed previously, although any feature of device can be used to determine difference values, the threshold engine 128 can remove difference values generated between one or more features indicating language of a given device if the threshold engine 128 obtains data indicating that, for a given A/B test, that particular feature will not bias results.

Action Engine

Data indicating whether or not the observed distribution 116 satisfies an imbalance threshold is provided, e.g., by the imbalance engine 113, to the action engine 130. The action engine 130 determines an action to perform using the data. Actions can include generating the imbalance detection 132 and transmitting data indicating the imbalance detection 132 to the NB testing engine 134. The NB testing engine 134 can include one or more computers for performing an NB test using data from one or more of the devices 102a-c. Data transmitted to the NB testing engine 134 representing the imbalance detection 132 can be configured to halt any analysis or data retrieval to help reduce computational resources used for testing that does not satisfy thresholds for balanced NB groups.

In some implementations, the action engine 130 performs one or more other actions. For example, the action engine 130 can transmit one or more signals to affect which version one or more subsequent requesting devices obtain. The action engine 130 can proactively affect which devices receive which version to correct a detected imbalance between distributions of devices that receive a version A or B. The action engine 130 can determine, e.g., using output from the threshold engine 128, that a type of device is causing a portion of a difference contributing to the observed distribution 116 satisfying an imbalance threshold. The action engine 130 can transmit a signal to the version provider 110 configured to adjust which types of devices, e.g., after a device provides information, which version a given device receives. The signal can indicate a version to provide to a specific type of device causing a portion of a difference contributing to the observed distribution 116 satisfying an imbalance threshold to help reduce the difference and change the observed distribution 116 so that it no longer satisfies the imbalance threshold.

In some implementations, the action engine 130 transmits data to control a number of additional devices required to correct an imbalance or a total number of devices that are required before devices can be provided a default version, e.g., version A 112a or version B 112b. For example, the action engine 130 can transmit data to the version provider 110 configured to assign all devices a given type—e.g., devices using a Chromium browser, located in the United States, operating with an English language set, among other features—to one or more specific versions, such as version A 112a or version B 112b. The action engine 130 can determine that an imbalance is caused by too few devices of a certain type assigned to a specific version and transmit a signal configured to assign more devices of the certain type, or similar type, to the specific version.

In one example, services provided by the versions 112a-b can include one or more exchange platforms. An exchange platform can enable exchange of goods, content, and services between users and providers. In one example case, providers can list or provide their goods, contents, and services on the exchange platform and users obtain the goods, content, and services from the providers via the exchange platform.

Before launching a new product feature (e.g., a new user interface element, a search feature, a new transaction execution process, etc.) on the platform (which may include an e-commerce platform), operators of exchange platforms can employ rigorous systems to determine whether an addition of a new feature would improve the user experience, reduce computation efficiency, decrease energy consumption, improve user experience, among others. As one example, for such determinations, a randomized experiment, such as an NB test (or another appropriate test such as a multivariate test) is deployed, which quantifies the impact of a feature by presenting it to a random set of users and computing measuring performance metrics on the e-commerce platform. Such experiments can help ascertain whether an observed change in computed metrics (e.g., increased user activity, additional transactions on the platform) can be attributed to the new feature.

In the example of FIG. 1, the NB testing engine 134 can perform one or more NB tests. In some implementations, the NB testing engine 134 performs one or more multivariate testing. The imbalance engine 113 can determine imbalances for NB testing, multivariate testing, among other testing schemes where devices are provided multiple versions of software or a service to test for feature changes in the software or service. Assessment can be performed using randomized experiments, such as NB tests, that can quantify the impact of a feature by presenting it to a random set of users. A goal of A/B testing can include measuring success metrics of software or a service affected and determining reliable attribution between a new feature being tested (e.g., in one of the versions 112a-b or more in a multivariate implementation) and an observed change in metrics tracked by software or a service.

Such randomized experimentation using NB tests (or other similar mechanisms) can be complex and computing resource intensive, and can lead to incorrect conclusions if the experiments are not correctly configured/set up. One problem that can arise in misconfigured experiments is imbalance, where the groups being compared consist of such dissimilar user populations that any attempt to credit the feature under test with a change in metrics can be erroneous. Moreover, subsequent manual verification of incorrect experiment configurations and associated results can be resource intensive and impinge on the ability to conduct widespread experiments of this format.

In general, one innovative aspect of the subject matter described in this specification can be embodied in methods for detecting imbalance in a randomized experiment that tests an impact of providing a particular feature on an e-commerce platform to performance metrics of the e-commerce platform. In some implementations, the operations of the method for detecting imbalance include generating the randomized experiment to test two variants of the e-commerce platform based on interactions by N user devices, including (1) identifying a first subset of the N user devices that will receive a first variant of the e-commerce platform including the particular feature (e.g., the devices 102a-b receiving the version A 112a), and (2) identifying a second subset of the N users who will receive a second variant of the e-commerce platform that does not include the particular feature (e.g., the device 102c receiving the version B 112b), wherein the N users are segmented into a plurality of segments.

In some implementations, an actual contingency table is generated, e.g., by the imbalance engine 113, that identifies a total number of users for each combination of segment and variant in the plurality of segments and the different variants. For example, the imbalance engine 113 can determine the observed distribution 116 and the number of users 118 based on user information 108 obtained by the imbalance engine 113. The contingency table can include various features of devices that make up the population of devices that receive a given version of software or service, among others. Various features can include, location of the device, language selected for a corresponding application, platform describing the hardware of the device, among others such as those described in this document.

In some implementations, a distance between the actual contingency table and an expected contingency table is calculated to obtain a first value for a U-statistic, which indicates a degree of imbalance in the randomized experiment. For example, the threshold engine 128 can determine one or more difference values between the expected distribution 126 and the observed distribution 116. The threshold engine 128 can include one or more generated sample distributions 124 or cannot include one or more generated sample distributions 124 to determine the one or more difference values.

In some implementations, to verify statistical significance of the computed first value of the U-statistic, a permutation test is performed. A permutation test can include computing, for each variant (otherwise referred to as feature of a device) in the actual contingency table, a permutation of each variant M times, to obtain M different values of the U-statistic, and generating a distribution indicating frequencies for the computed M different values of the U-statistic. In some implementations, the sample engine 120 performs one or permutation tests to generate the sample distributions 124. The sample distributions 124 can indicate how many of each type of device received each version, e.g., version 112a-b. The sample engine 120 can permute one or more values of the observed distribution 116, or feature of devices in the observed distribution 116, to generate one or more of the sample distributions 124.

In some implementations, if a first value of the U-statistic exceeds a predetermined quantile of the generated distribution, it is determined that a degree of imbalance indicated by the first value is statistically significant and accurately reflects a degree of imbalance indicated by this first value. The first value can be compared to a predetermined threshold value for the U-statistic. If the first value exceeds a predetermined threshold value for the U-statistic, it can be determined that the degree of imbalance exceeds an acceptable amount of imbalance in the randomized experiment, in which case the randomized experiment is not allowed to run (e.g., performed by the NB testing engine 134) and a signal can be sent requesting reconfiguration of the randomized experiment. If, however, the first value does not exceed the predetermined threshold value for the U-statistic, it can be determined that the degree of imbalance does not exceed an acceptable amount of imbalance in the randomized experiment, in which case the randomized experiment can be allowed to run. As described in reference to FIG. 1, the threshold engine 128 can determine whether or not the observed distribution satisfies an imbalance threshold generated using the expected distribution 126 and the sample distributions 124. The action engine 130, can generate one or more actions to be performed by the imbalance engine 113 or one or more components communicably connected to the imbalance engine 113.

Flawed NB testing setups, such as imbalanced data, can lead to incorrect conclusions. One problem that can arise in misconfigured experiments is imbalance, where groups being compared include such dissimilar user or corresponding device populations that any attempt to credit a given feature under test with a change in success metrics becomes questionable. The techniques described in this document setup guardrails to protect analysis, which may be computationally and energy intensive, being performed on data that has been infected by imbalance from dissimilar user or device groups.

This document describes a system, e.g., the system 100, configured to automatically detect imbalance. The system 100 and the underlying processes can be scaled to accommodate hundreds or thousands of experiments every day, depending on available computational resources. Computation and energy cost per experiment can be reduced using techniques described in this document.

Figure 2A:
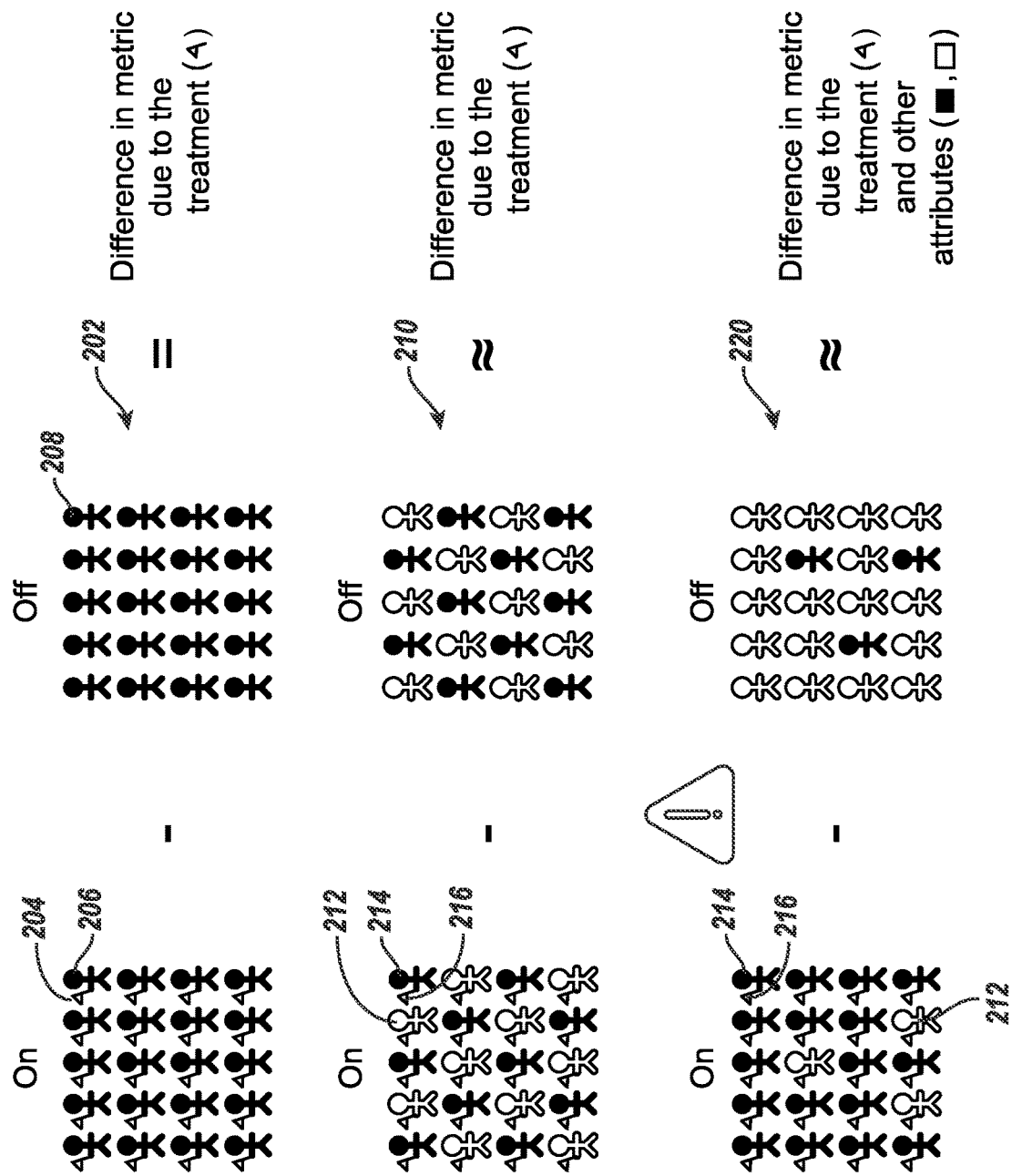
FIG. 2A is a diagram showing an example of different population compositions used for NB testing.

FIG. 2A is a diagram showing an example of different population compositions used for NB testing. An A/B test aims to quantify an impact of a treatment (e.g. a new product feature in software or a service) by measuring a change in a metric of interest (e.g. the processing resources required for a user session, percentage of users who make a purchase, among others) between two groups of users or corresponding devices. The two groups can include a control group that do not receive a feature being tested and a treatment group that do receive the feature. Provided that the groups are balanced—e.g., including user populations that are similar in every aspect but the variant presented to them in the form of the tested feature—observing a significant difference in any metric of interest between the two groups can be a reliable indication that the treatment has had a direct impact on it. This is the first case 202 shown in FIG. 2A that shows an example of different population compositions used for A/B testing.

In the first case 202 of FIG. 2A the only differentiating trait between the treatment group (labeled "on") and the control group (labeled "off") is a variant they are presented (e.g., their exposure or non-exposure to the treatment, symbolized by the flag 204), then a tester, e.g., the A/B testing engine 134 can confidently conclude that a change in any given metric of interest is caused by the treatment 204. A user 206 receives a tested feature 204 and the user 208 in the control group does not. These users can be similar to the devices 102a-c of FIG. 1 in that the devices 102a-c are assigned a version of the versions 112a-b just as the users of the first case 202 are assigned the treatment 204 or not.

Balance can be engineered. By allocating users to treatment or control groups randomly and with no reliance on any user information, groups are likely to become increasingly similar as their sizes grow. In particular, it would be expected for groups to exhibit equal distributions of user attributes, for every possible attribute (e.g. user location, signed-in status, among others). This allows for a meaningful comparison of metric values between the groups (although perhaps not providing as direct results as the first case 202). This second case 210 is also shown in FIG. 2A. In the second case 210, users are not the same—e.g., user 212 has different features compared to user 214—but they both receive treatment 216, such as a given software or service version. An example of the treatment 216 can be version A 112a.

In the presence of other user attributes (otherwise referred to as device features)—e.g. signed-in users, colored blue, vs. signed-out users in green—the effect of treatment 216, such as a change in one or more analyzed metrics, can still be determined with relative accuracy. Accuracy of attribution in this way can decrease with the growing imbalance of the different types of users. If user distributions in the two groups are too dissimilar, and corresponding change in metrics may be due to the change in user composition as opposed to whether the user received or did not receive the treatment 216, such as the version A 112a. When the balance of user types corresponding to user 212 and user types corresponding to user 214 is close to parity, it is understood that, due to such balance, any effects from user attributes (otherwise referred to as features) can offset each other when computing a difference in metric values, leaving only the treatment 216 as the main contributor to the observed change.

In real life, implementing randomized allocation can involve non-trivial code, data pipelines, case-specific logic and so on, all of which are susceptible to errors. As a result, experimental setups generally are observed as inadvertently producing imbalanced groups, e.g., where the distributions of specific user attributes differ drastically between treatment and control. In these cases, a change in the metric cannot be read as the sole effect of the treatment, since disparities in other user attributes might also have had an impact on the outcome. Results from an imbalanced experiment are necessarily ambiguous and unreliable. Such imbalanced is shown in the third case 220 of FIG. 2A. In the third case 220, user types of the user 214 vastly outnumber user types of the user 212 in the group with the treatment 216 with the reverse imbalance in the group without the treatment 216.

The third case 220 shows an example imbalance typical from some real experiments. Such an imbalance may not be intended by a randomized allocation mechanism and can cast doubt on a validity of the experiment—e.g., can introduce bias such that attributing an effect of adding or removing a feature in a version, such as the version A or B 112a-b, to one or more tracked metrics may be impossible or produce erroneous attribution. Performing such analysis can be costly computationally and in terms of energy as the analysis would need to be re-performed with a more balanced data set. Stopping the testing before analysis is performed, as discussed in reference to FIG. 1, can help reduce energy and computational resource expenditure in these sorts of testing environments.

When a user attribute or features exhibits different distributions between the treatment group (labeled "on") and the control group (labeled "off"), the contribution of the treatment 216 to the change in one or more tracked metric values becomes ambiguous due to, e.g., comparison of two groups made of dissimilar user populations, whose metric values could differ even in the complete absence of any treatment.

Since balance is expected from a properly randomized allocation, the presence of imbalanced groups in an experiment can be a red flag that warrants investigation. Observing uneven distributions of a particular user attribute could suggest even more imbalance in other, unmeasured attributes (which are referred to as confounding factors), as well as deeper issues with how the experiment was implemented. Identifying such imbalances is therefore important to preventing experimenters from reaching invalid conclusions or wasting computational or energy resources.

In some implementations, the imbalance detected by the imbalance engine 113 includes determining bucketing skew at the level of different subgroups within devices or users provided versions of software or services.

Although there is no comprehensive list of all possible causes of imbalance, there are common patterns of experimental setups that tend to produce it. One frequent cause of imbalance is when the way the treatment is implemented introduces unforeseen behaviors in the data pipelines. For example, treated browsers, with a given new feature, can send back frontend events faster than non-treated browsers, with the unintended effect of enabling bots to circumvent parts of any applied bot-filtering logic. This can gave rise to a treatment group that has significantly more bots in it than the control, and the experiment is thus imbalanced. Such imbalance can be detected by the imbalance engine 113.

The design of an experiment itself can be another source of imbalance. This is especially true for experiments that select their users based on particular conditions. For instance, when the treatment is targeted to specific pages (e.g. enabling videos in the thumbnails of listing pages), it could seem preferable to restrict the experiment only to users who reach those pages. But consider what happens if the treatment inadvertently causes page loads to fail more often for users with unreliable internet connections. If a test only logs data when the targeted page loads successfully, this can skew the treatment group against that subset of users. In contrast with the control, the treatment group will exhibit an overrepresentation of users from locations with faster internet connections, hindering a fair comparison. Generally speaking, asymmetrical triggering conditions or data logging (sometimes referred to as activation biases) between treatment and control groups are quite susceptible to creating imbalance. Imbalance of this type can be detected, as described in reference to FIG. 1, by the imbalance engine 113.

Implementation and design flaws in NB tests are difficult to preempt, more so as the volume and complexity of experiments increase. This document describes techniques for a generic detection system that could run autonomously and would be valid for any given experiment. Since data collected by flawed processes generally cannot be salvaged and online traffic is a precious resource, the system, e.g., the system 100 can notify testing devices about potential imbalances early in a lifetime of experiments to reduce wasted computational and energy use.

Figure 2B:
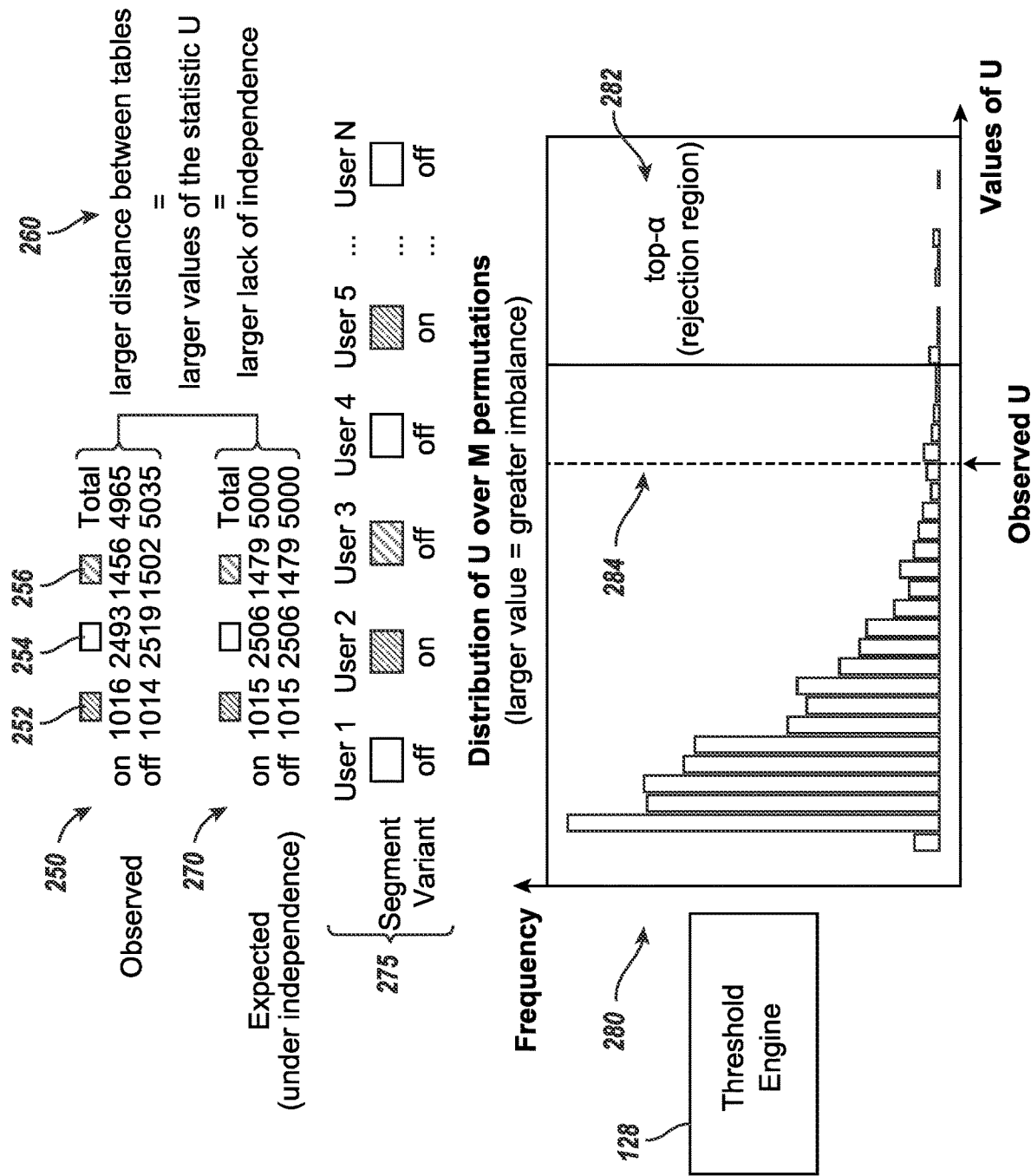
FIG. 2B is a diagram showing an example of observed and expected population compositions and an example of applying a threshold to detect imbalance.

FIG. 2B is a diagram showing an example of observed and expected population compositions and an example of applying a threshold to detect imbalance. A user population can be described through the lens of segmentations, which are different ways of partitioning a population into a finite number of distinct subgroups. For example, a segmentation by signed-in status would include two possible segments, respectively for signed-in and signed-out users. Given a particular segmentation and an experiment with N users, data can include N independent pairs of labels, indicating which segment and which variant each user belongs to. The data can be summarized by counting the number of users in each of the combinations of segment and variant. These counts can be collected into what can be referred to as a contingency table.

An example of a contingency table 250 is shown in FIG. 2B. Given an experiment with N users, data shown in FIG. 2B includes N independent pairs of labels. Each pair indicates the segment (e.g., segment 252, 254, and 256) and the variant (labeled "on" for the treatment group or "off" for the control group) of the corresponding user. Segments can take any finite number of values, although 3 are shown in FIG. 2B for ease of illustration.

The contingency table 250 includes 1 column per possible segment and 1 row per possible variant, where each cell indicates the number of users or corresponding devices having the corresponding combination of segment and variant. The last column indicating total number of users can be included in the contingency table 250 or not included in the contingency table 250 depending on implementation. The example contingency table 250 uses 2 variants, 3 segments, and N=10,000 users. More generally, with R variants and C segments, the contingency table would be of size R by C (i.e., R×C). Any number of variants or segments can be used to generate a given contingency table.

In reference to FIG. 1, the contingency table 250 can be generated by the imbalance engine 113. The segments of the contingency table 250 can represent different features of the user devices 102a-c. The variants can indicate which devices of the devices 102a-c received version A 112a or version B 112b.

In general, a contingency table, such as the contingency table 250, can capture a distribution of segments for each variant in data. Determining whether groups are balanced includes determining whether conditional distribution of segments, within a particular variant, remains the same regardless of what variant is evaluated. In statistical terms, this can include assessing whether the two variables "segment" and "variant" are independent. Therefore, the detection of imbalance can be formally cast as a test for the lack of independence between two variables.

Generally, an expected contingency table can be known based on a number of variants and corresponding segments. Such an expected contingency table can be generated by the expected distribution engine 122 as the expected distribution 126. The system 100 can quantify a lack of independence by measuring how far an observed table (e.g., the observed distribution 116) is from this expected table (e.g., the expected distribution 126). In some implementations, one or more difference values are generated by the threshold engine 128. For example, the threshold engine 128 can use a discrepancy function denoted as U. In general, larger values of U signal stronger lack of independence, and thus greater imbalance, as shown in item 260 of FIG. 2B.

An expected contingency table 270 can be derived, e.g., by the expected distribution engine 122, using the user information 114. The expected distribution engine 122 can use the observed distribution 116 or the number of users 118 to generate the expected distribution 126, in an example of which is shown as the expected contingency table 270. The expected contingency table 270 shows what the numbers for different variants and segments would be if segment and variant were independent. The statistic U can represent one or more values of distance between the observed table 250 and the expected table 270 (e.g., difference between the observed distribution 116 and the expected distribution 126). Larger values of U indicate larger lack of independence. In some implementations, the imbalance engine 113 generates a function to describe how U can vary given a number of users, variants, or segments.

For ease of illustration, the expected table 270 assumes equal probabilities of allocation to the treatment and control groups (respectively labeled "on" and "off"), so the expected contingency table is obtained by keeping the total numbers of units in each segment fixed and forming equally sized groups within each segment. In other implementations, the number of users in different segments or variants can be other relative values, e.g., not equal across segments or variants.

Knowing values U can take when independence holds allows a system to determine which values are unusual enough to constitute evidence against a hypothesized independence. In general, if segment and variant are independent, then all possible permutations of the observed variant labels will have equal probabilities of occurring. Item 275 shows individual user assignments to variant and segments. Under the assumption that segment and variant are independent, all the possible permutations of the observed variant labels can share the same probability of occurrence.

To perform permutations, the sample engine 120 of FIG. 1 can generate the sample distributions 126. Each permutation of variant labels can generate a new contingency table (also referred to as a sample distribution), which produces its own value of U, representing one or more values of difference from an expected distribution or table. By randomly permuting these labels M times (for a chosen large number M), the sample engine 120 can generate M values of U. The M values of U can be equally probable under independence. The M values can indicate how U would be distributed if segment and variant were truly independent Each permutation can generate a particular contingency table or distribution and a corresponding value of U. The simulated values of U can be used to generate a histogram 280, where values of U are represented on the x-axis and their frequencies are on the y-axis.

Since larger values of U indicate more imbalance, the imbalance engine 113 can determine an imbalance when an observed U exceeds a threshold. The threshold, e.g., applied by the threshold engine 128, can be an upper $\alpha$-quantile of a distribution generated, e.g., by the threshold engine 128, indicating one or more difference values of the sample distributions 124 and the expected distribution 126. $\alpha$ can be chosen or computed by the imbalance engine 113 based on user input or refined by a model over time detecting one or more imbalances and receiving input as to whether or not the imbalance was actually statistically significant, e.g., as determined by experts. $\alpha$ can determine how conservative the threshold engine 128 is in detecting imbalances. By defining a p-value as the proportion of values (out of M+1) that are at least as large as our observed U, the threshold engine 128 can determine that the observed distribution 116 satisfied a threshold for imbalance if the p-value is less than a.

The histogram 280 shows an example of determining a statistically significant imbalance. Given a distribution of U under assumption of independence between segment and variant, the threshold engine 128 can determine an observed distribution of devices is imbalanced, to a statistically significant degree, if the threshold engine 128 determines an observed U lands inside a rejection region 282. The rejection region 282 can include one or more thresholds. The rejection region 282 can be defined as the upper tail of a distribution with level a, where a can be determined by the threshold engine 128 between 0 and 1. The threshold engine 128 can reject existence of independence if the observed U—e.g., generated from the difference between the observed distribution 116 and the expected distribution 126—is greater than $100\times(1-\alpha)$ percent of the (M+1) values. The threshold engine 128 can reject existence of independence when an associated p-value of a generated distribution is less than a, where the threshold engine 128 can compute the p-value by adding up the heights of all the blue bars on the right side of the observed U 284.

In addition to having optimal detection properties, techniques described herein, including the permutation testing, relate to a family of exact tests. Unlike other common tests that rely on large-sample approximations (e.g. chi-squared test, G-test, among others), a probability of a false detection with permutation testing is at most a regardless of the sample size. This is particularly important given that the system 100 is implemented to alert testing users or devices about imbalances as early as possible in the experiment, to avoid wasting energy or computational resources.

Scalability

Techniques described in this document include a method to detect imbalance for a given experiment and a specific user segmentation. The method can include performing a permutation test to produce a p-value, then declaring imbalance if the p-value passes a chosen threshold as described, e.g., in reference to FIG. 1. The detection is important but the ability to scale the solutions is also important so the imbalance detection can be applied to tens, hundreds, or thousands of segmentations and hundreds or thousands of experiments that may be run every day, each experiment potentially involving up to tens of millions of users.

One consideration for scalability is computational. A naive implementation could store individual labels from all N users and perform the required permutation tests by successively permuting labels (possibly tens of millions), repeating that step about a hundred thousand times, and doing the entire procedure for every experiment and each segmentation. That would require quadrillions of operations for just a single day of data, every day, which would be prohibitively costly and would drastically slow generation of experimental results.

What makes permutation tests viable is that: 1) a contingency table (instead of individual tables) is needed to compute the statistic U; 2) permuting individual labels induces a particular probability distribution of contingency tables, which can be derived analytically, e.g., by the expected distribution engine 122; and 3) it is possible to sample from a distribution directly. This can lead to improvements, since performing one permutation with R variants and C segments can be reduced to sampling R×C numbers instead of N. Experiments can typically include two variants and about five segments (for a given segmentation) although more or less is possible, and this means sampling only ten numbers per permutation rather than tens of millions for a given example.

The techniques described in reference to the system 100 can obtain major efficiency gains by leveraging parallelizable structure of the problem. The parallelizable structure can include all permutation tests, which can be independently run in parallel (one test per experiment per segmentation). For a given test, all permutations can be drawn in parallel as well. This allows the techniques described to be used in distributed computing to perform tests at scale.

However, being able to run thousands of permutation tests at high speed may still present challenges. With such a large number of tests at play, the system 100 can also address the scalability question from a statistical perspective—e.g., the more tests for which the system 100 performs imbalance detection, the more susceptible the system 100 is to raising false alerts, unless we take active precautions.

With M permutations, a smallest possible p-value that a permutation test can generate by construction is equal to $1/(M+1)$. On the other hand, the smallest threshold involved in a BH procedure decreases with the number of tests performed. In other words, as the number of tests, and corresponding computational resources, increases, corrective actions to preserve statistical validity can become stricter and require the system 100 to increase a number of permutations within each test, which in turn can make each test more computationally intensive. This illustrates how computational scalability and statistical scalability can be closely intertwined.

To mitigate this, the system 100 can use the Benjamini-Hochberg (BH) procedure. Rather than interpreting each test separately, the BH procedure specifies collecting p-values from all the tests, and applies an adaptive thresholding rule to determine which ones are statistically significant while guaranteeing a desired false discovery rate (e.g., bounding the expected ratio of the number of false alerts over the number of alerts). In some implementations, the threshold engine 128 uses the BH procedure to group imbalance detections to ensure a predetermined false discovery rate. In this manner, by combining the techniques described in this document, the system 100 can provide an imbalance detection system that is scalable both computationally and statistically.

From a computational standpoint, the system 100 can be scalable because, using parallelization, total time needed for computation does not increase as the number of experiments to process increases. From a statistical standpoint, the system can be scalable because the error rate (e.g., false positive rate or how frequently the system 100 could give false alerts) does not deteriorate as the number of experiments increases.

Figure 3:
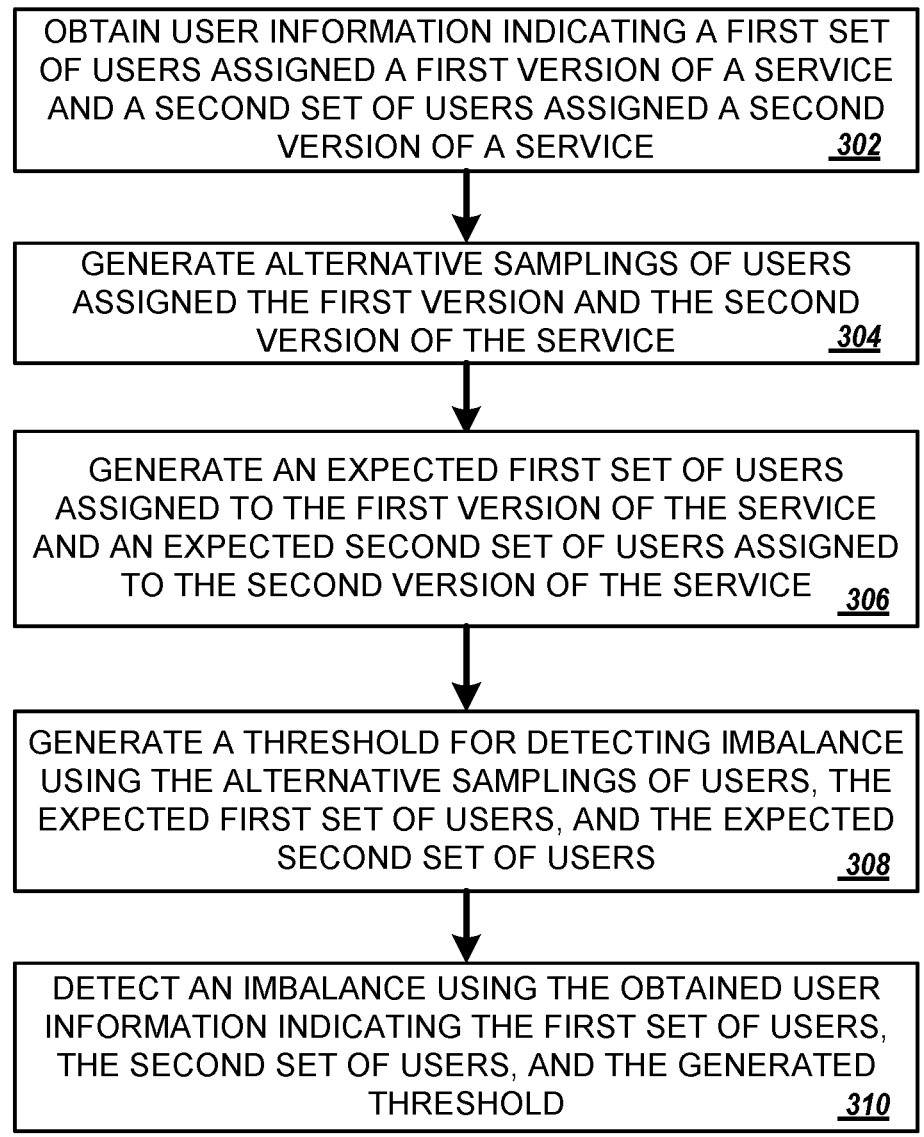
FIG. 3 is a flow diagram illustrating an example of a process for detecting imbalance in online experiments.

FIG. 3 is a flow diagram illustrating an example of a process 300 for detecting imbalance in online experiments. The process 300 may be performed by one or more electronic systems, for example, the system 100 of FIG. 1. In some implementations, operation of the process 300 can be implemented as instructions stored on a non-transitory computer readable medium, where execution of the instructions by one or more data processing apparatus cause the one or more data processing apparatus to perform operations of the process 300.

The process 300 includes obtaining user information indicating a first set of users assigned a first version of a service and a second set of users assigned a second version of a service (302). For example, the imbalance engine 113, e.g., as described with reference to FIG. 1, can obtain the user information 108 and generate the user information 114 indicating the observed distribution 116 and the number of users 118. The observed distribution 116 can indicate a first set of users assigned a first version of a service and a second set of users assigned a second version of a service. The first set of users can include the user devices 102a-b that received the version A 112a. The second set of users can include the user device 102c that received the version B 112b. The observed distribution 116 can include other devices not shown in FIG. 1 for simplicity.

The process 300 includes generating alternative samplings of users assigned the first version and the second version of the service (304). For example, the sample engine 120, e.g., as described with reference to FIG. 1, can generate the sample distributions 124 that indicate alternative samplings of users assigned to the versions 112a-b. The sample engine 120 can perform one or more permutations on variants and segment data indicating features of devices assigned either version A 112a or version B 112b.

The process 300 includes generating an expected first set of users assigned to the first version of the service and an expected second set of users assigned to the second version of the service (306). For example, the expected distribution engine 122, e.g., as described with reference to FIG. 1, can generate the expected distribution 126. The expected distribution 126 can indicate what devices, with corresponding features indicating a segment of the devices, should be assigned to given variants, e.g., version A 112a or version B 112b, if segment and variant were independent.

The process 300 includes generating a threshold for detecting imbalance using the alternative samplings of users, the expected first set of users, and the expected second set of users (308). For example, the threshold engine 128, e.g., as described with reference to FIG. 1, can generate one or more difference values, shown graphically in histogram 280. The one or more difference values can indicate a difference between one or more samples of the sample distributions 124 and the expected distribution 126 including comparing a number of devices for a given segment and variant within a sample to a number of devices for the same segment and variant in the expected distribution 126.

The process 300 includes detecting an imbalance using the obtained user information indicating the first set of users, the second set of users, and the generated threshold (310). For example, the threshold engine 128, e.g., as described with reference to FIG. 1, can determine if the observed distribution 116 satisfies an imbalance threshold determined using the sample distributions 124 and the expected distribution 126. In some implementations, the threshold is an upper α-quantile of a distribution generated from one or more difference values of the sample distributions 124 and the expected distribution 126, as shown graphically in histogram 280. In some implementations, the threshold engine 128 uses the BH procedure to ensure a predetermined false discovery rate.

In some implementations, the process 300 includes implementing a corrective action to mitigate the detected imbalance in the multivariate testing framework. For example, as described in reference to FIG. 1, the action engine 130 can notify the A/B testing engine 134 or engage in proactive correction of imbalances in the observed distribution 116. The observed distribution 116 can change over time to alleviate imbalance as the action engine 130 controls subsequent or current devices or users to be assigned a particular version, e.g., a version that users or devices of that type have not received enough of therefore at least partially contributing to a detected imbalance. Current devices can include the devices 102a-c. Subsequent devices can include devices that transmit and receive signals to and from the version provider 110 after the devices 102a-c have obtained data indicating their corresponding versions—e.g., versions 112a-b.

In some implementations, the process 300 includes generating one or more difference values between the obtained user information, indicating the first set of devices and the second set of devices, and the expected first and second set of devices. For example, the process 300 can include generating a U value. The statistic U can represent one or more values of distance between the observed table 250 and the expected table 270, described in reference to FIG. 2B, e.g., difference between the observed distribution 116 and the expected distribution 126. Larger values of U indicate larger lack of independence. In some implementations, the imbalance engine 113 generates a function to describe how U can vary given a number of users, variants, or segments. As shown in the third case 220 of FIG. 2A, when users or devices of different types are not balanced in groups provided a given version of software or service, this can increase one or more difference values and increase a corresponding U value. The U value can include one or more summations of difference values or other calculations that incorporate one or more generated difference values between values representing the numbers of different types of users or devices within a treated and non-treated groups, e.g., in an NB testing framework as described in reference to FIG. 1.

Figure 4:
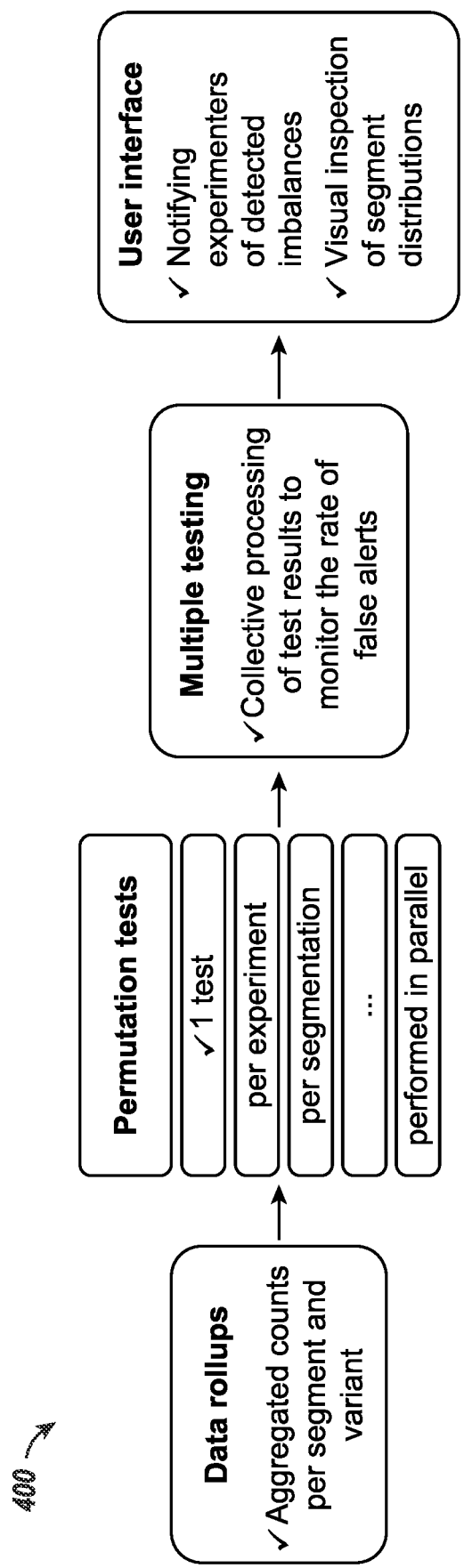
FIG. 4 is a flow diagram illustrating an example of a process for obtaining data, detecting imbalance in online experiments, and performing one or more subsequent actions.

FIG. 4 is a flow diagram illustrating an example of a process 400 for obtaining data, detecting imbalance in online experiments, and performing one or more subsequent actions. The process 400 can be performed by one or more computer systems, such as the system 100. In some implementations, operation of the process 400 can be implemented as instructions stored on a non-transitory computer readable medium, where execution of the instructions by one or more data processing apparatus cause the one or more data processing apparatus to perform operations of the process 400.

FIG. 4 represents a "bird's-eye" view of an imbalance detection system. Given a number of users in each segment and variant for each experiment, permutation tests can be performed in parallel, while accounting for multiple testing. In some implementations, accounting for multiple testing is performed, e.g., by one or more elements of the system 100, by using a detection threshold (e.g., the alpha of the top alpha of the rejection region 282 of FIG. 2B). The detection threshold can be a function of a number of tests being performed (e.g., an alpha indicating a detection threshold can vary depending on how many imbalance detection tests have been performed or are to be performed). The more tests the system 100 performs, the more likely the system 100, e.g., an element such as the imbalance engine 113, is to give a false alert. In some implementations, the detection threshold can increase, or be made less likely to generate false alerts, to offset an increase in tests being performed to, e.g., maintain a false positive/negative rate or other related rate or stay within a false positive/negative range.

Teams can be notified, as a part of one or more other actions taken after the imbalance engine 113 detects an imbalance, of detected imbalances. Users can inspect a segment distribution in their experiments or be provided, by the imbalance detection, with data indicating a segment distribution or other details of the devices assigned different versions and why the imbalance engine 113 detected an imbalance.

The process 400 begins with collecting a number of users for each combination of experiment, segment, and variant. Storage requirements can be kept to a minimum—e.g., the imbalance engine 113 can access and store only aggregated counts of users rather than individual labels. These counts can include inputs for permutation tests, e.g., performed by the sample engine 120. Permutation tests can be performed using an implementation in Spark, among other environments, that takes advantage of parallel computing and efficient sampling processes discussed in this document. Outputs of the tests can be post-processed collectively, e.g., by the threshold engine 128, to ensure an acceptable, e.g., a predetermined, rate of false alerts.

Figure 5A:
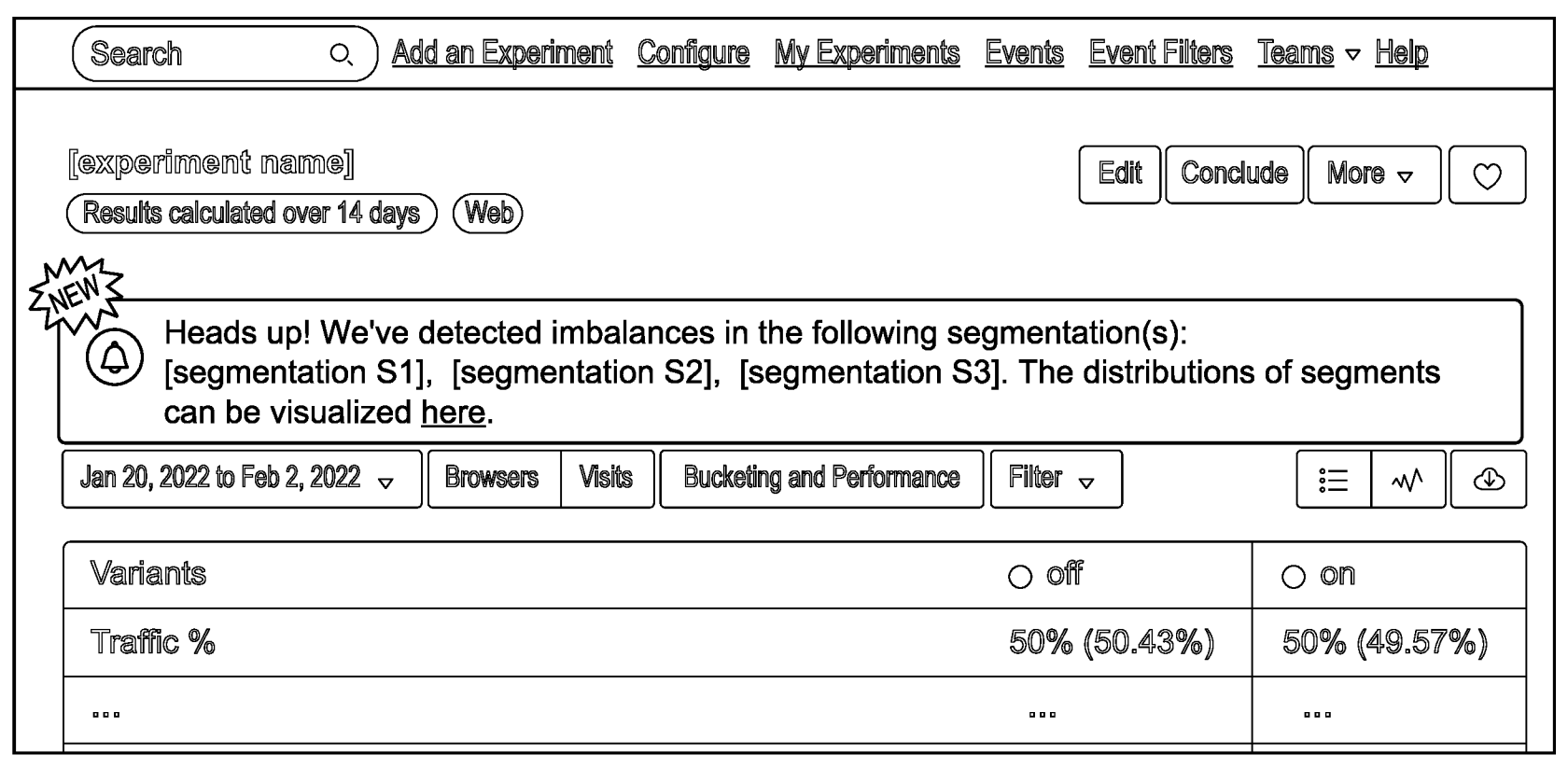

Detected imbalances trigger warning banners that can be transmitted as data configured to display the banners graphically to a user by the imbalance engine 113. The banners can be transmitted and configured to pop up on concerned experiments' dashboards. Experiment users can get automatically informed of experiments that show signs of imbalance. An example of such a notification is shown in FIG. 5A.

Figure 5B:
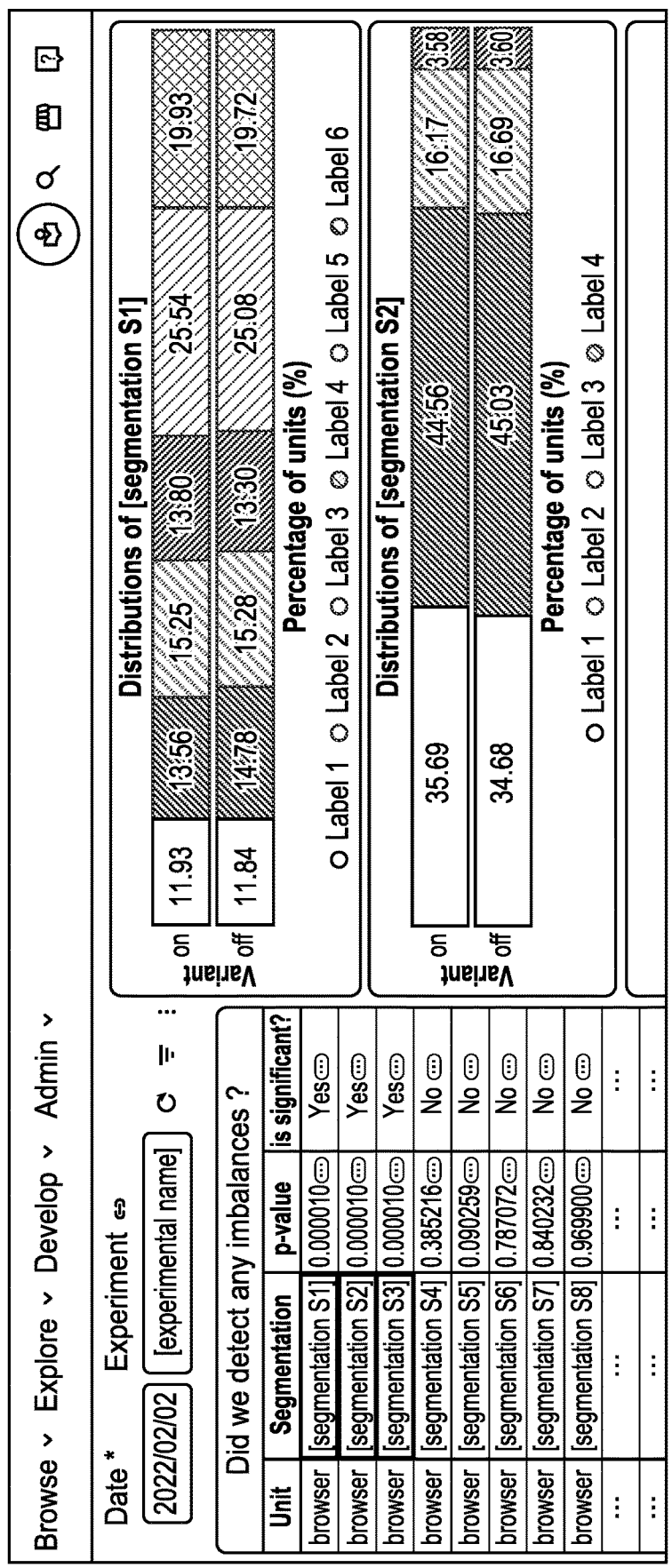
FIG. 5B is a diagram showing example information provided with a notification indicating an imbalance detection.

FIG. 5B is a diagram showing example information provided with a notification indicating an imbalance detection. Detected imbalances can be surfaced directly on monitoring pages of experiments via a warning banner 502 shown in FIG. 5A. The banner can indicate which segmentations are suspicious and can prompt experimenters to inspect distributions of segments using a dedicated visualization tool shown in FIG. 5B. Specific details about the experiment and the segmentations are inessential to this illustration and have been redacted.

Upon detecting an imbalance, the system 100 can generate and transmit a signal, such as the imbalance detection 132, to testing users, e.g., the A/B testing engine 134. The imbalance detection 132 can be configured to prompt experimenters to inspect the affected segmentations and can provide a link or portal to a tool to visualize corresponding distributions of segments processed by the imbalance engine 113. Inspections can lead to further actions (e.g. interrupting the experiment) depending on the severity of the situation, e.g., one or more ranges above or below a determined imbalance threshold associated with corresponding actions, such as notifying one or more users or proactively adjusting assignment of current or subsequent users or devices. As discussed, the imbalance engine 113 can also perform action in addition to, or instead of, notifying experiments of the imbalance including proactively adjusting subsequent devices that receive one version or another, among others.

In some implementations, the system 100 determines a severity of an imbalance. For example, the imbalance engine 113 can determine how many segments are imbalanced. Segments can include features such as region, language used by device, buyer type, channel, platform, among others, such as those discussed in this document. The imbalance engine can obtain data indicating imbalance between two or more segments and determine a number or amount of imbalance for each. If two or more segments are simultaneously imbalanced, the imbalance engine 113 can determine that such an imbalance is more severe than another imbalance where only one segment is imbalance as compared to a threshold or one or more other segment values. In some implementations, the imbalance engine 113 compares a number of imbalances to a quantity threshold. For example, the imbalance engine 113 can compare one or more values indicating a number of users or devices in one or more segments (e.g., types of users or devices assigned to a given version or variant) to one or more thresholds, such as a threshold indicated by region 282 of FIG. 2B. The imbalance engine 113 can compare a number of segments with imbalances to a threshold quantity (e.g., one, two, three, among others) and determine a given imbalance for a test is severe, with corresponding specific actions taken (e.g., by the action engine 130), when the number of segments with imbalances satisfies the threshold quantity.

In this document the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. In some implementations, an engine includes one or more processors that can be assigned exclusively to that engine, or shared with other engines.

Figure 6:
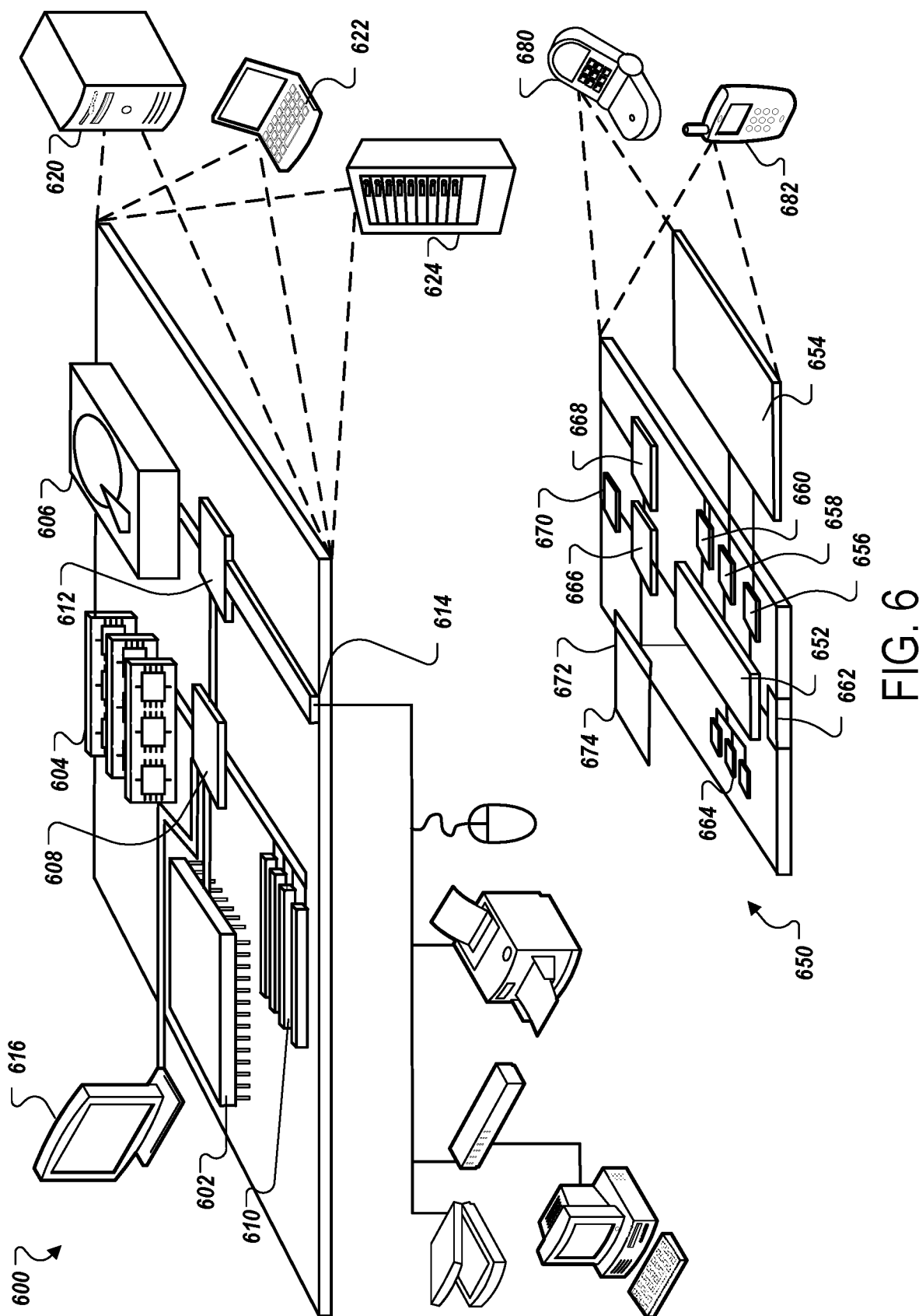
FIG. 6 is a diagram illustrating an example of a computing system used for detecting imbalance in online experiments.

FIG. 6 is a diagram illustrating an example of a computing system used for detecting imbalance in online experiments. The computing system includes computing device 600 and a mobile computing device 650 that can be used to implement the techniques described herein. For example, one or more components of the system 100 could be an example of the computing device 600 or the mobile computing device 650, such as a computer system implementing the imbalance engine 113, devices that access information from the imbalance engine 113, or a server that accesses or stores information regarding the operations performed by the imbalance engine 113.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 602 is a single threaded processor. In some implementations, the processor 602 is a multi-threaded processor. In some implementations, the processor 602 is a quantum computer.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may include one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, among others) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   obtaining user information indicating a first set of devices assigned a first version of a service and a second set of devices assigned a second version of the service in a multivariate testing framework;
   generating alternative samplings of devices assigned to the first version and the second version of the service;
   generating an expected first set of devices assigned to the first version of the service and an expected second set of devices assigned to the second version of the service;
   generating a threshold for detecting imbalance using the alternative samplings of devices, the expected first set of devices, and the expected second set of devices;
   detecting an imbalance using the obtained user information indicating the first set of devices, the second set of devices, and the generated threshold; and
   implementing a corrective action to mitigate the detected imbalance in the multivariate testing framework.

2. The method of claim 1, wherein the user information is obtained from a computer system that provides the first version of the service and the second version of the service to the first set of devices and the second set of devices.

3. The method of claim 1, wherein generating the alternative samplings of devices assigned to the first version and the second version of the service comprise:
   performing one or more permutations on values representing segments or variants of the user information indicating the first set of devices assigned the first version of the service and the second set of devices assigned the second version of the service.

4. The method of claim 1, wherein generating the alternative samplings of devices assigned the first version and the second version of the service comprise:
   sampling from a distribution indicating a numerical range of types of devices assigned to the first version or the second version of the service where the types of devices that receive either the first version or the second version of the service is independent from the types of devices.

5. The method of claim 1, wherein generating the expected first set of devices assigned to the first version of the service and the expected second set of devices assigned to the second version of the service comprises:
   generating one or more values indicating a number of devices of a specific type that receive the first version and the second version of the service.

6. The method of claim 5, wherein the devices of the specific type are devices operating in a specific region, operating with a specific language preference, operating on a specific hardware, or operating on a specific software.

7. The method of claim 1, wherein generating the threshold for detecting the imbalance using the alternative samplings of devices, the expected first set of devices, and the expected second set of devices comprises:
   generating one or more difference values indicating a difference between a sample of the alternative samplings of devices and a sample of the expected first set of devices and the expected second set of devices.

8. The method of claim 1, wherein generating the threshold for detecting the imbalance using the alternative samplings of devices, the expected first set of devices, and the expected second set of devices comprises using obtained data indicating the threshold for detecting the imbalance to determine a quantile of a distribution created using the alternative samplings of devices, the expected first set of devices, and the expected second set of devices as the threshold for detecting the imbalance.

9. The method of claim 1, comprising:
   generating one or more difference values between the obtained user information, indicating the first set of devices and the second set of devices, and the expected first and second set of devices; and
   wherein detecting the imbalance using the obtained user information indicating the first set of devices, the second set of devices, and the generated threshold comprises determining that the one or more difference values generate a cumulative difference value that is equal to or greater than a threshold difference value generated using one or more difference values generated between the alternative samplings of devices and the expected first and second set of devices.

10. The method of claim 1, wherein implementing the corrective action to mitigate the detected imbalance in the multivariate testing framework comprises:
    generating a notification for a testing device; and
    transmitting the notification to the testing device.

11. The method of claim 10, wherein the notification is configured to halt one or more data processing processes on the testing device.

12. The method of claim 1, wherein implementing the corrective action to mitigate the detected imbalance in the multivariate testing framework comprises:
    generating a signal configured to assign additional devices to the first version or the second version to reduce the detected imbalance.

13. The method of claim 12, wherein the additional devices comprise a device of a particular type represented by one or more device or user features associated with the detected imbalance.

14. A non-transitory computer-readable medium storing one or more instructions executable by a computer system to perform operations comprising:
    obtaining user information indicating a first set of devices assigned a first version of a service and a second set of devices assigned a second version of the service in a multivariate testing framework;
    generating alternative samplings of devices assigned to the first version and the second version of the service;
    generating an expected first set of devices assigned to the first version of the service and an expected second set of devices assigned to the second version of the service;

generating a threshold for detecting imbalance using the alternative samplings of devices, the expected first set of devices, and the expected second set of devices;

detecting an imbalance using the obtained user information indicating the first set of devices, the second set of devices, and the generated threshold; and implementing a corrective action to mitigate the detected imbalance in the multivariate testing framework.

15. The medium of claim 14, wherein the user information is obtained from a computer system that provides the first version of the service and the second version of the service to the first set of devices and the second set of devices.

16. The medium of claim 14, wherein generating the alternative samplings of devices assigned to the first version and the second version of the service comprise:

performing one or more permutations on values representing segments or variants of the user information indicating the first set of devices assigned the first version of the service and the second set of devices assigned the second version of the service.

17. The medium of claim 14, wherein generating the alternative samplings of devices assigned the first version and the second version of the service comprise:

sampling from a distribution indicating a numerical range of types of devices assigned to the first version or the second version of the service where the types of devices that receive either the first version or the second version of the service is independent from the types of devices.

18. The medium of claim 14, wherein generating the expected first set of devices assigned to the first version of the service and the expected second set of devices assigned to the second version of the service comprises:

generating one or more values indicating a number of devices of a specific type that receive the first version and the second version of the service.

19. The medium of claim 18, wherein the devices of the specific type are devices operating in a specific region, operating with a specific language preference, operating on a specific hardware, or operating on a specific software.

20. A system, comprising:

one or more processors; and machine-readable media interoperably coupled with the one or more processors and storing one or more instructions that, when executed by the one or more processors, perform operations comprising:

obtaining user information indicating a first set of devices assigned a first version of a service and a second set of devices assigned a second version of the service in a multivariate testing framework;

generating alternative samplings of devices assigned to the first version and the second version of the service;

generating an expected first set of devices assigned to the first version of the service and an expected second set of devices assigned to the second version of the service;

generating a threshold for detecting imbalance using the alternative samplings of devices, the expected first set of devices, and the expected second set of devices;

detecting an imbalance using the obtained user information indicating the first set of devices, the second set of devices, and the generated threshold; and implementing a corrective action to mitigate the detected imbalance in the multivariate testing framework.

* * * * *